United States Patent Office 3,380,562
Patented Apr. 30, 1968

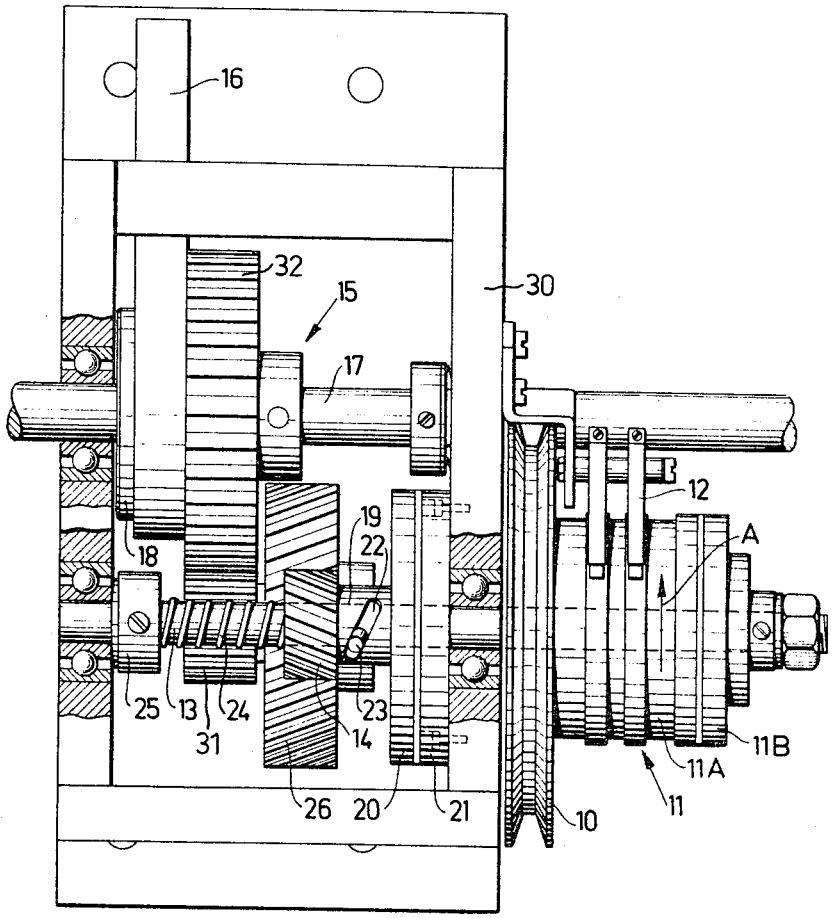

3,380,562
DRIVING MECHANISMS, PARTICULARLY FOR MOTOR-DRIVEN ADDRESS PRINTING AND LIKE MACHINES
Rolf Brorsson Dahlin, Hassleholm, Sweden, assignor to Cliegraf Aktiebolaget, Jamjeslatt, Sweden
Filed Oct. 3, 1966, Ser. No. 583,717
Claims priority, application Sweden, Oct. 8, 1965, 13,056/65
4 Claims. (Cl. 192—8)

ABSTRACT OF THE DISCLOSURE

A driving mechanism for preventing back drive from a driven shaft including a unitized control mechanism consisting of a pinion gear, intermeshed with a second gear mounted on said driven shaft; a collar; and a first friction disk interconnected with an input shaft by means of a pin and spiral slot; wherein, a torque spring fixed to the input shaft and control mechanism biases the first friction disk into engagement with a second friction disk fixedly mounted on a frame to prevent back drive from the driven shaft; however, said spiral slot and pin also allows the input shaft, connected to a power source by means of an electromagnetic clutch, to axially and rotatably move the control mechanism away from the fixed disk until the pin has reached one end of the slot; thereinafter, said utilized control provides a direct drive between the input and output shafts.

---

This invention relates to a driving mechanism particularly for motor-driven address printing and like machines.

For many uses, for example in motor-driven address printing and like machines, one is greatly in want of a driving mechanism which has a constantly motor-driven input member and is adapted to drive an operating means such as a printing arm, intermittently in operating cycles with intervening inoperative periods varying very considerably in length, and to keep the operating means braked during said inoperative periods.

To this end, there has been suggested the use of an assembly comprising an electromagnetic clutch and an electromagnetic brake, in which the input member of the clutch also constitutes the rotatable part of the brake, the input member of the clutch is drivable by the motor, and the output member of the clutch is connected with the operating means via a transmission. This assembly, it is true, is satisfactory from many points of view, but the electromagnetic brake is relatively expensive in manufacture and cannot keep the transmission and the operating means braked when the machine is deenergized.

Suggestions have also been made to connect a rotatable and axially displaceable shaft in an axially displaceable but non-rotatable manner to the input member of a transmission, said shaft carrying a rotatable part of a friction brake and the output member of a friction clutch the input member of which is driven by a motor, a spring arranged on the shaft tending to keep the clutch engaged. In this device, the non-rotatable member of the brake can be applied by means of an electromagnet against the rotatable brake member which is secured to the shaft, in order to brake said shaft and said transmission while the shaft is displaced axially to disengage the friction clutch. This device is unsuitable from many points of view. It should be pointed out specifically that braking must be started while the clutch is still engaged, which leads to considerable slip due to the motor drive power both in the clutch and the brake during the initial stage of the brake engaging and the clutch disengaging operation. As a consequence, the brake and the clutch are heavily heated and rapidly worn when many short and frequently repeated operating cycles have to be effected by the operating means driven by the device. Besides, the non-rotatable brake member must be applied with relatively great force against the rotatable brake member so that one will have to utilize a heavy-duty electromagnet to operate the non-rotatable brake member. Also, the operating means and the transmission are not kept braked when the machine is deenergized.

Finally, it has also been suggested to secure to an axially displaceable and rotatable shaft leading to an operating means a disc which can be pressed against the input member of a friction drive clutch by displacing the shaft in one direction, and against a non-rotatable friction brake member by displacing the shaft in the opposite direction. The input member of the drive clutch is driven by a motor. Axial displacement of the shaft is attained in that the shaft has screw threads with which an axially non-displaceable control nut engages, said nut being coupled by means of a control slip clutch to the input member of the drive clutch and lockable against rotation by latch means. This device is expensive because of the difficulty of mounting the parts and by the necessity of providing an additional slip clutch for the engagement and disengagement of the drive clutch and the brake, and it also constitutes a serious drawback that the control slip clutch has to slip for all of the period when the motor is in operation but the operating means is at rest, which results in unfavourable heating and rapid wear of the slip clutch, if the driving mechanism is employed in a machine the operating means of which may be at rest for long periods while the drive motor is in operation, as is the case for instance in address printing and like machines.

One object of the present invention is to provide a driving mechanism that overcomes the above outlined drawbacks of the prior-art mechanisms.

Another object of the invention is to provide a driving means having a motor-driven clutch the output member of which drives a transmission which is equipped with a brake and the output member of which drives an operating means, the brake being automatically disengaged when the clutch is engaged, and automatically engaged when the clutch is disengaged.

Still another object of the invention is to provide a driving mechanism of the type mentioned, in which the brake is always engaged and retains said operating means when the clutch is disengaged, irrespective of whether the motor driving the clutch operates or whether the machine is entirely put out of operation.

A further object of the invention is to provide a driving mechanism of the type mentioned, in which the slip of the clutch and the brake is kept at a minimum at the start of said operating means.

A still further object of the invention is to provide a driving mechanism of the type mentioned, in which the slip of the clutch and the brake is kept at a minimum when said operating means is stopped.

An additional object of the invention is to provide such a driving mechanism of a reliable and inexpensive construction.

The above mentioned objects of the invention are satisfied by the invention providing a driving mechanism comprising a motor-driven clutch input member, a clutch output member forming a disengageable clutch together with said clutch input member, frame means, a shaft rotatably but axially non-displaceably mounted in said frame means and fixedly connected with said clutch output member, transmission means mounted on said frame means, a stationary brake member fixedly mounted on said frame means, a control means rotatably and axially displaceably mounted on said shaft, an input means of said transmission means forming part of said control means, a rotatable brake member adjacent to said stationary brake member for co-operation therewith and forming part of said control means, interengaging cam means on said shaft and said control means for restricting the movement of said control means on said shaft to a limited screw movement along and around said shaft, a torque spring surrounding said shaft and connected at one end with said shaft and at the other end with said control means and holding, when said clutch is disengaged, said rotatable brake member of said control means applied against said stationary brake member by exerting a torque between said control means and said shaft, said torque tending to screw said control means along said shaft as guided by said interengaging cam means for applying said rotatable brake member against said stationary brake member.

These and further features of the invention and the advantages gained thereby will appear from the following detailed specification in which reference is made to the accompanying drawing illustrating an embodiment, seen in side elevation, of a driving mechanism according to the invention.

The driving mechanism illustrated is supplied with drive power from a motor (not shown) through a belt transmission incorporating a V-belt pulley 10. Said pulley is fixedly connected to an input member 11A of an electro-magnetic friction clutch which is generally designated 11 and which is supplied with current across sliding contacts 12 for engagement of the clutch. The output member 11B of the electro-magnetic clutch 11 is keyed to a shaft 13 which is rotatably but axially non-displaceably mounted in a frame 30 and carries control means having a pinion 14 forming the input member of a transmission generally designated 15 and the output member of which is a shaft 17 for driving an operating means, for instance a printing arm of an address printing machine. In the embodiment selected the operating means (not shown) is driven by a connecting rod 16 the large end of which is rotatably mounted to a crank disc 18 eccentrically secured to the shaft 17. In the embodiment selected the transmission has a gear 26 engaging the pinion 14 and secured to a shaft which in the drawing lies concealed behind the shaft 13 and to which also a gear 31 is secured which meshes with a gear 32 secured to the output shaft 17. The rotary shafts of the transmission are mounted in the frame 30.

In addition to the pinion 14 the control means has a sleeve 19 fixedly connected thereto, and a rotatable friction brake disc 20 fixedly connected to the sleeve. The control means 14, 19, 20 can be screwed to a restricted extent along the shaft 13 in that the sleeve 19 has a short closed-ended slot 22 which is slightly oblique relative to planes perpendicular to the axis of the sleeve, i.e., the slot is helically extending. A pin 23 secured to the shaft 13 engages in said slot 22. The brake disc 20 is kept pressed in inoperative position by a torque spring 24 against a friction brake disc 21 fixedly mounted in the frame 30. Said torque spring 24 has one end fixedly anchored in a spring fastening 25 to the shaft 13 which is axially non-displaceable in relation to the brake disc 21, and the other end fixedly anchored to the control means 14, 19, 20. The torque spring 24 tends to screw the control means 14, 19, 20 along the shaft 13 under a torque which is adjustable, by locking the spring fastening 25 to the shaft 13 in a desired angular position, to a value smaller, and preferably only slightly smaller, than the torque which the shaft 13 has to transmit to the pinion 14 to drive the connecting rod 16.

The driving mechanism described in the foregoing functions as follows:

When the motor drives the V-belt pulley 10 and the electro-magnetic clutch 11 is engaged the shaft 13 is carried along in the direction of the arrow A. Initially, the shaft is rotated in relation to the control means 14, 19, 20 retained by the brake disc 21 and the transmission 15, the torque spring 24 being tensioned at the same time as the control means is screwed along the shaft due to the pin 23 engaging in the cam slot 22, whereby the brake disc 20 is raised from the brake disc 21. After the brake has thus been disengaged and the pin 23 is at the upper end of the slot 22 (as seen in the drawing) the control means and thus the pinion 14 begin to take part in the rotation of the shaft 11, said pinion thereby driving the transmission 15 and the connecting rod 16. During the initial stage of the engagement of the clutch 11 the latter shall thus only transmit power for driving the shaft 13 in relation to the pinion 14 retained by the brake 20, 21 and the transmission 15 while the torque spring 24 is tensioned and the brake is disengaged so that the slip in the clutch and the brake is kept at a minimum when the connecting rod 16 is started. As the shaft 13 has to transmit a greater torque to the pinion 14 than what corresponds to the torque of the spring 24, the pin 23 will engage the upper end of the slot 22 (as seen in the drawing) so that the torque transmitted will be independent of the strength of the spring.

When the clutch 11 is then disengaged the motor ceases to drive the shaft 13 whereby the torque spring 24 which was tensioned at the engagement of the clutch is given the opportunity of rotating the shaft 13 in the direction opposite to the arrow A in relation to the control means which now continues to rotate together with the transmission 15 and is thereby screwed along the shaft 13 in such a direction that the brake disc 20 is pressed against the stationary brake disc 21 whereby the rotation of the control means and the transmission is rapidly interrupted. The slip of the clutch 11 and the brake 20, 21 when the connecting rod 16 stops will thus also be as small as possible because the clutch must be disengaged before the brake can be automatically applied by allowing the torque spring 24 after disengagement of the clutch to rotate the shaft 13 in the sense opposite to the driving direction in relation to the control means 14, 19, 20 for engaging the brake.

To support the screwing movement of the control means 14, 19, 20 along the shaft 13 both at the start and the stop of the transmission 15 the pinion 14 and the transmission gear 26 meshing therewith are equipped with helical gear teeth as shown in the drawing in such a way that the teeth of the pinion 14 have a pitch opposite to that of the helically extending cam slot 22.

Instead of using screw cam means in the form of a slot 22 and a pin 23 it is of course possible to use meshing threads on the shaft 13 and the control means 14, 19, 20.

What I claim and desire to secure by Letters Patent is:

1. A driving mechanism comprising a motor-driven clutch input member, a clutch output member forming a disengageable clutch together with said clutch input member, frame means, a shaft rotatably but axially non-displaceably mounted in said frame means and fixedly connected with said clutch output member, transmission means mounted on said frame means, a stationary brake member fixedly mounted on said frame means, a control means rotatably and axially displaceably mounted on said shaft, an input means of said transmission means forming part of said control means, a rotatable brake member adjacent to said stationary brake member for co-operation therewith and forming part of said control means, interengaging cam means on said shaft and said control means for restricting the movement of said control means on said shaft to a limited screw movement along and around said shaft, a torque spring surrounding said shaft and connected at one end with said shaft and at the other end with said control means and holding, when said clutch is disengaged, said rotatable brake member of said control means applied against said stationary brake member by exerting a torque between said control means and said shaft, said torque tending to screw said control means along said shaft as guided by said interengaging cam means for applying said rotatable brake member against said stationary brake member.

2. A driving mechanism as claimed in claim 1, in which said interengaging cam means have helically extending cam surfaces of one pitch, and said input means of said transmission means is a gear having helically extending teeth of opposite pitch.

3. A driving mechanism as claimed in claim 1, in which said rotatable and stationary brake members are friction brake members.

4. A driving mechanism as claimed in claim 1, in which said clutch input and output members are input and output members of an electromagnetic clutch.

References Cited

UNITED STATES PATENTS

| | | | |
|---|---|---|---|
| 352,623 | 11/1886 | Lewis | 192—15 |
| 554,131 | 2/1896 | Maris | 192—15 |
| 844,808 | 2/1907 | Kendall | 192—15 |
| 1,021,347 | 3/1912 | Windhoff | 188—82.9 XR |
| 1,351,792 | 11/1920 | Sawyer | 188—82.9 XR |
| 1,925,474 | 11/1933 | Wilsing | 192—12 |
| 2,003,795 | 6/1935 | Wilsing | 192—12 XR |

CARLTON R. COYLE, *Primary Examiner.*

C. LEEDOM, *Assistant Examiner.*